Oct. 25, 1966  H. W. KISLING  3,281,103
CART FOR MIXING BOWLS

Filed Feb. 9, 1965  2 Sheets-Sheet 1

INVENTOR.
Howard W. Kisling
BY Webster & Webster
ATTORNEYS

3,281,103
CART FOR MIXING BOWLS

Howard W. Kisling, Turlock, Calif., assignor of one-half to Frank T. Finnegan, Turlock, Calif.
Filed Feb. 9, 1965, Ser. No. 431,299
1 Claim. (Cl. 248—132)

This invention relates in general to kitchen equipment and particularly to a cart for use in a commercial-type kitchen as in schools, cafeterias, bakeries, and the like where food is prepared in relatively large quantities.

In kitchens of this character, ingredients for making bread, rolls, cookies, and similar bakery-type products are placed in a large-capacity bowl, mixed therein, and then ladled out or otherwise removed in piecemeal quantities from the bowl for forming on pans preparatory to baking; this latter step preferably being conducted with the bowl at approximately waist height for convenience. This requires lifting of the bowl from a lowered, ingredient-receiving and mixing position (where it is used in cooperation with a commercial mixer) to the aforesaid waist high or raised position; the weight of such a fully lowered bowl, however, being such as to tax the strength of the workers who frequently are women.

It is, therefore, the principal object of the invention to avoid the necessity of manually lifting such a large-capacity mixing bowl by providing a portable cart designed to removably support the bowl in a stable manner, and having means whereby the bowl can be readily raised (and subsequently lowered) the necessary distance with a minimum of physical effort.

A further object of the invention is to provide a cart for mixing bowls which is designed for ease and economy of manufacture, and convenience of use.

A still further object of the invention is to provide a practical, reliable, and durable cart for mixing bowls and one which is exceedingly effective for the purpose for which it is designed.

These objects are accomplished by means of such structure and relative arrangement of parts as will fully appear by a perusal of the following specification and claims.

Figure 1:
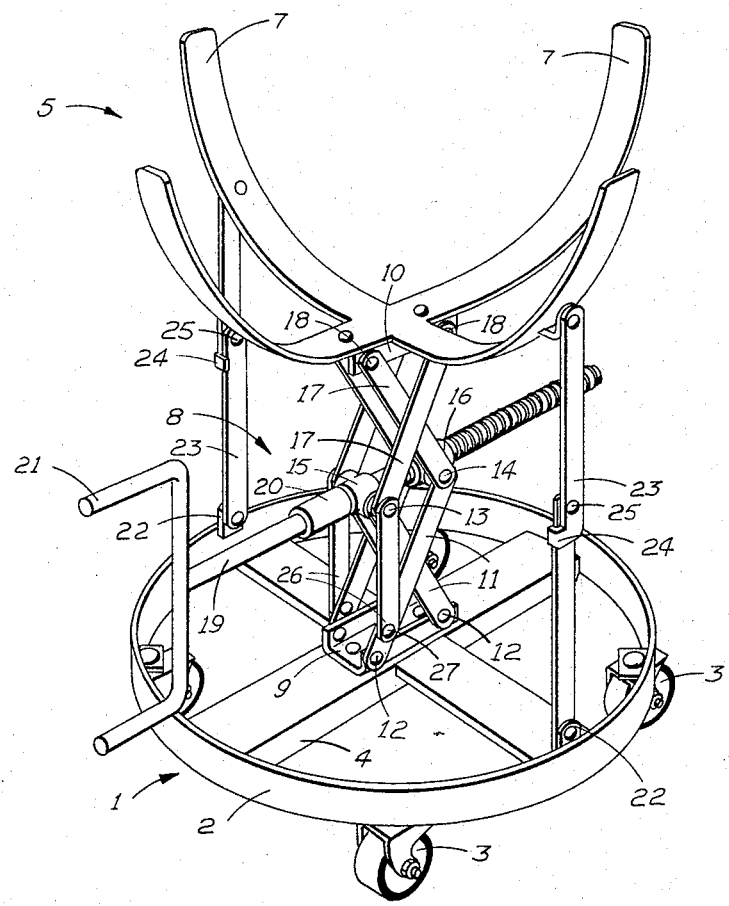
FIG. 1 is a perspective view of the mixing bowl cart with the cradle in a raised position.

Referring now more particularly to the drawings and to the characters of reference marked thereon, the cart comprises a base indicated generally at 1. Such base preferably consists of a circular ring 2 supported by a plurality of caster wheels 3 disposed in evenly spaced relation thereabout, and a rigid diametral beam 4 in and extending between opposite sides of the ring 2.

A cradle, indicated generally at 5, adapted to removably support a large-capacity mixing bowl 6 of conventional form, is disposed above and in symmetrical relation to the base 1; said cradle comprising a plurality of circumferentially spaced, upwardly and outwardly curved arms 7 shaped to matchingly engage the curved bottom portion of the bowl 6.

The cradle 5 is supported from the base 1 for vertical movement relative thereto by a jack unit, indicated generally at 8, which extends between a bracket 9 mounted centrally on and upstanding from the beam 4 lengthwise thereof, and a similar parallel bracket 10 secured to and depending from the bottom of the cradle 5 centrally thereof.

The jack unit 8 comprises transversely spaced pairs of lower links 11; the links of each pair crossing intermediate their ends and being pivoted, as at 12, at their lower ends on the bracket 9 at longitudinally spaced points thereon.

At their upper ends the links 11 of each pair thereof are pivoted, as at 13 and 14, on the corresponding side of short cross blocks 15 and 16, respectively.

Transversely spaced pairs of upper links 17 project upwardly from the pivots 13 and 14 in crossing relation to each other intermediate their ends, and at their upper ends said links 17 are pivoted on the bracket 10 in spaced relation along the same as shown at 18.

A screw shaft 19 is threaded through the block 16 and slidably projects through the block 15; there being a stop collar 20 on the shaft 19 in engagement with the end of the block 15 opposite the block 16. Beyond the block 15, at a suitable distance so as to not contact the base 1, the shaft 19 is provided with a crank-type handle 21 which may be of the single or double type.

On each side, the base ring 2 is provided with a vertical ear 22 to which the lower end of a folding two-section link unit 23 is pivoted. Such link unit 23 is pivoted at its upper end on the adjacent arm 7 of the cradle 5. When each unit 23 is in a fully extended and vertical position and the two sections of the unit are alined, it is prevented from moving beyond a dead-center position in one direction by means of a lug 24 on one section engaging the other section beyond the connecting pivot 25 of the sections as shown. The link units 23—being quite widely spread—aid the jack unit 8 in preventing the cradle 5 from tending to turn relative to the base 1, and when fully extended stiffen the cradle against possible lateral tilting movement.

Figure 2:
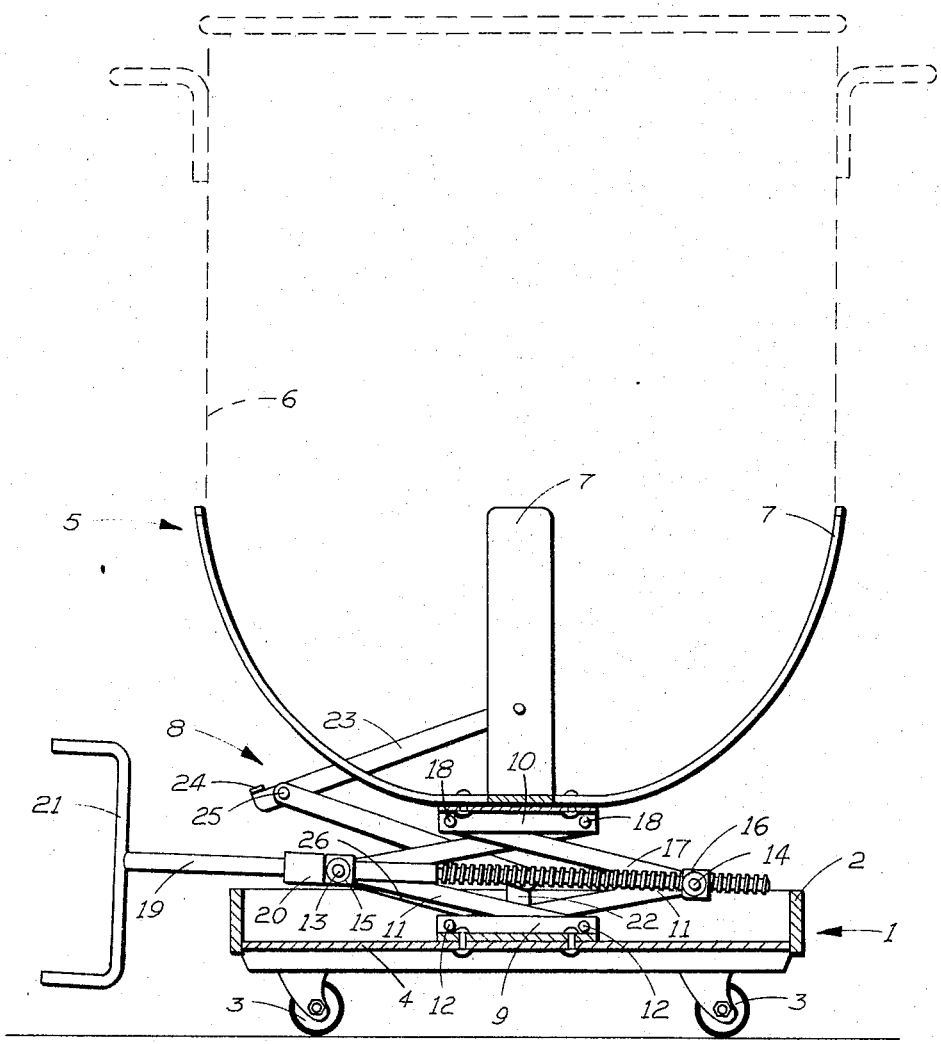
FIG. 2 is a sectional elevation of the cart with the cradle in a lowered position.

At each side of the block 15 a depending link 26 is attached to pivot 13 and thence depends to a pivotal connection 27 on the related one of the links 11 which extends to the block 16; the connection 27 being intermediate the ends of such link 11 and relatively close to the lower pivoted end thereof. The two links 26 are disposed so that as the jack links become contracted and the operating screw shaft 19 approaches the level of the base 1, said shaft will assume somewhat of an upward angle relative to a horizontal plane as shown in FIG. 2. This is for the purpose of raising the handle 21 somewhat, when the cradle 5 is in its lowermost position, so that said handle can be conveniently operated without being too close to the floor on which the cart is supported.

In operation, rotation of the screw shaft 19 in one direction or the other will cause the pairs of links 11 and 17 to be expanded or contracted whereby to raise or lower the cradle 5 and bowl 6 supported thereby.

When the cradle 5 and supported bowl 6 are in lowered position, the described cart is moved on the floor to position the bowl for cooperation with a commercial-type, power mixer. Thereafter, when the ingredients in the bowl have been mixed, the cart is rolled away from the power mixer and to the point where said mixed ingredients are to be removed from said bowl. The cradle 5 and supported bowl 6 are then raised to substantially waist height (by the jack unit 8) for ease and convenience of access to said bowl and the contents thereof.

When the jack links 11 and 17 are in their fully contracted position, they are immediately adjacent the base 1, and the lower sections of the then folded link units 23 rest on the sides of the base, thus preventing possible lateral teetering of the lowered cradle 5 and bowl 6.

The base ring 2 is of somewhat smaller diameter than the cradle and thus of the bowl 6 supported thereby, while being symmetrically disposed relative thereto. There is, therefore, little chance of the operator while handling the contents of the bowl possibly stubbing a foot against such base ring.

From the foregoing description, it will be readily seen that there has been produced such a cart for mixing bowls as substantially fulfills the objects of the invention, as set forth herein.

While this specification sets forth in detail the present and preferred construction of the cart for mixing bowls, still in practice such deviations from such detail may be resorted to as do not form a departure from the spirit of the invention, as defined by the appended claims.

Having thus described the invention, the following is claimed as new and useful and upon which Letters Patent is desired:

A cart, for supporting a mixing bowl, comprising a portable base, a bowl-locating and supporting cradle above the base, a jack having a longitudinal axis mounted on and upstanding from the base centrally thereof and connected to the bottom of the cradle centrally thereof, the jack being arranged to prevent teetering movement of the cradle in a vertical plane along said longitudinal axis, and means between the cradle and base preventing teetering movement of the cradle in a vertical plane at right angles to the first named vertical plane irrespective of the raised or lowered position of the cradle relative to the base; said means comprising a sectional foldable link unit on each side of the cradle in transverse alinement with the longitudinal axis of the jack and in widely spaced relation to each other and disposed, when extended, in said right angle vertical plane, and transverse pivots connecting each such link unit at its ends to the cradle and base.

References Cited by the Examiner

UNITED STATES PATENTS

| | | | |
|---|---|---|---|
| 1,036,203 | 8/1912 | Fackler | 248—129 |
| 1,885,170 | 11/1932 | Anderson | 254—9.2 |
| 2,174,953 | 10/1939 | Staveley | 248—416 |
| 2,745,676 | 5/1956 | Scott | 248—129 X |
| 2,821,242 | 1/1958 | Manegold | 248—421 |
| 3,000,683 | 9/1961 | MacNeary | 248—439 X |

FOREIGN PATENTS 485,547   8/1952   Canada.

CLAUDE A. LE ROY, *Primary Examiner.*

R. P. SEITTER, *Assistant Examiner.*